(12) United States Patent
Herrmann

(10) Patent No.: US 10,177,839 B2
(45) Date of Patent: Jan. 8, 2019

(54) NETWORK WITH COMMON TRANSMISSION CHANNELS

(71) Applicant: KONINKLIJKE PHILIPS N.V., Eindhoven (NL)

(72) Inventor: Christoph Herrmann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 183 days.

(21) Appl. No.: 15/174,008

(22) Filed: Jun. 6, 2016

(65) Prior Publication Data
US 2016/0285544 A1    Sep. 29, 2016

Related U.S. Application Data

(63) Continuation of application No. 10/258,047, filed as application No. PCT/IB02/00802 on Mar. 15, 2002, now Pat. No. 9,363,833.

(30) Foreign Application Priority Data

Mar. 17, 2001   (DE) .................................. 101 13 034
Jul. 11, 2001   (DE) .................................. 101 33 032

(51) Int. Cl.
*H04B 7/26*    (2006.01)
*H04W 74/08*   (2009.01)
(Continued)

(52) U.S. Cl.
CPC ........ *H04B 7/2671* (2013.01); *H04W 72/044* (2013.01); *H04W 74/004* (2013.01);
(Continued)

(58) Field of Classification Search
None
See application file for complete search history.

(56) References Cited

U.S. PATENT DOCUMENTS

| 5,577,024 A | 11/1996 | Malkamaki et al. |
| 5,896,385 A | 4/1999 | Achilleoudis |

(Continued)

FOREIGN PATENT DOCUMENTS

| EP | 0523648 A2 | 1/1993 |
| EP | 0993214 A1 | 4/2000 |

(Continued)

OTHER PUBLICATIONS

Technical Specification, "Physical Channels and Mapping of Transport Channels Onto Physical Channes (FDD)", 3GPP TS 25.11 V3 5.0, 2000, pp. 1-45.

(Continued)

*Primary Examiner* — Christopher P Grey

(57) ABSTRACT

A wireless network with at least one base station and a plurality of associated terminals for the exchange of payload data and control data and at least one common transmission channel which is available for access to several terminals is described. The base station is configured to control access to the common transmission channel and the terminals are configured to send at least an access signal to the base station for the purpose of obtaining access to the common transmission channel. Different start moments and different preambles can be assigned to the terminals for transmitting their respective access signals.

21 Claims, 4 Drawing Sheets

Figure 1:
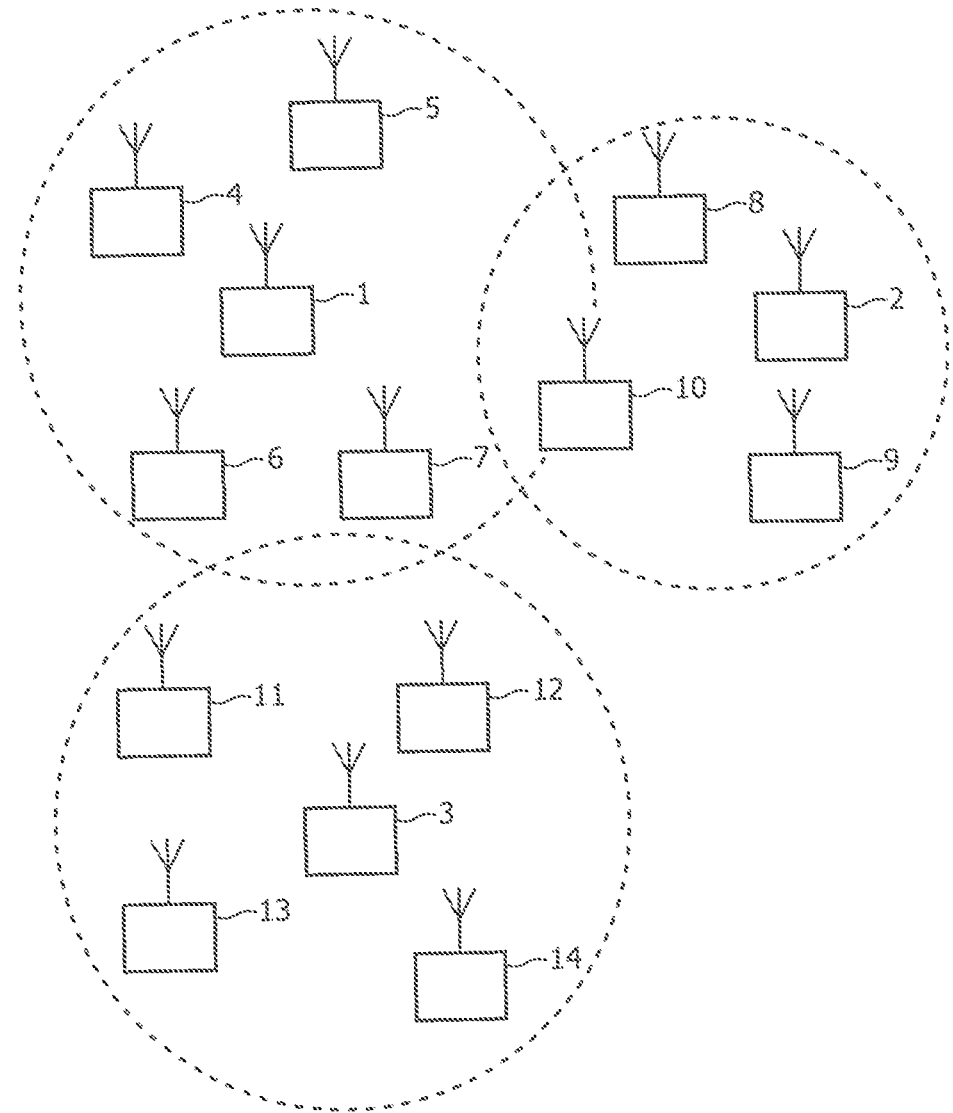

(51) Int. Cl.
*H04W 72/04* (2009.01)
*H04W 74/00* (2009.01)
*H04W 88/08* (2009.01)

(52) U.S. Cl.
CPC ..... *H04W 74/006* (2013.01); *H04W 74/0841* (2013.01); *H04W 74/0858* (2013.01); *H04W 88/08* (2013.01)

(56) References Cited

U.S. PATENT DOCUMENTS

| | | | | |
|---|---|---|---|---|
| 5,917,813 | A * | 6/1999 | Van Driel | H04J 3/1694 370/348 |
| 5,982,765 | A | 11/1999 | Shimada | |
| 6,188,910 | B1 * | 2/2001 | Park | H04W 48/12 455/434 |
| 6,449,282 | B1 | 9/2002 | Loher | |
| 6,480,525 | B1 | 11/2002 | Parsa et al. | |
| 6,597,675 | B1 | 7/2003 | Esmailzadeh et al. | |
| 6,606,309 | B1 | 8/2003 | Wang | |
| 6,606,341 | B1 * | 8/2003 | Kanterakis | H04B 7/2628 370/342 |
| 6,643,318 | B1 * | 11/2003 | Parsa | H04B 1/7103 370/335 |
| 6,674,765 | B1 | 1/2004 | Chuah | |
| 6,708,037 | B1 | 3/2004 | Moulsley et al. | |
| 6,788,702 | B1 * | 9/2004 | Garcia-Luna-Aceves | H04L 45/02 370/337 |
| 7,075,971 | B2 | 7/2006 | Parsa et al. | |
| 9,363,833 | B2 * | 6/2016 | Herrmann | H04W 74/0841 |
| 2001/0033579 | A1 | 10/2001 | Nelson et al. | |
| 2003/0026324 | A1 * | 2/2003 | Li | H04W 52/08 375/141 |
| 2003/0223452 | A1 | 12/2003 | Toskala et al. | |
| 2005/0117549 | A1 * | 6/2005 | Kanterakis | H04B 7/2628 370/335 |

FOREIGN PATENT DOCUMENTS

| | | |
|---|---|---|
| JP | 8213990 A | 8/1996 |
| JP | 2000134219 A | 5/2000 |
| WO | 9318601 A1 | 9/1993 |
| WO | 9960729 A1 | 11/1999 |
| WO | 0014989 A1 | 3/2000 |
| WO | 0111823 A2 | 2/2001 |

OTHER PUBLICATIONS

Goldens Bridge Technologies, "CPCH Access Procedures", Draft Minutes of WG2 Meeting #5, Sophia Antipolis, 1999, pp. 1-49.
Technical Specification, "Physical Layer Procedures (FDD)", 3GPP TS 25.214, V3.4.0, 2000, pp. 1-46.

* cited by examiner

NETWORK WITH COMMON TRANSMISSION CHANNELS

The invention relates to a network with common transmission channels.

The document 3GPP TS 25.211 V3.5.0, $3^{rd}$ Generation Partnership Project (3GPP) "Physical channels and mapping of transport channels onto physical channels (FDD)" proposes a radio transmission network which comprises common transmission channels which are available for the shared, demand-dependent utilization by several terminals. Such a channel may be, for example, the channel referred to as a CPCH channel (Common Packet Channel) in the cited document, or the channel referred to as a RACH channel (Random Access Channel) in the cited document.

The radio transmission network consists of a plurality of radio cells, each with a base station and with terminals or mobile stations present therein. After the registration and synchronization of a terminal, the base station can allot one or several common transmission channels to a terminal, as required. This takes place whenever the demand for messages of a terminal exceeds a certain threshold value. The terminal then selects a channel from the common transmission channels assigned to it, depending on its requirement, and first transmits an access preamble. The known radio network is designed such that the access preambles are transmitted several times with time intervals, and that the transmission power is increased each time until an acknowledge signal is sent from the base station to the terminal. It is signaled to the terminal by means of this acknowledge signal that the signal sent by the terminal was received by the base station with a sufficient power level. This procedure is also denoted power ramping.

To deal with possible collisions, the CPCH channel is designed such that the terminal upon receiving an acknowledge signal transmits a collision elimination preamble. This collision elimination preamble is randomly selected. The reception of the collision elimination preamble is also confirmed by the base station by means of an acknowledge signal. The terminal is not authorized to transmit the data part until after it has received the acknowledge signal in response to the collision elimination preamble. Collisions occur in such a channel only when two terminals accidentally select the same collision elimination preamble.

To deal with collisions, the slotted-ALOHA access procedure is provided in the case of the RACH channel, according to which collided data packets are transmitted once more after a randomly selected waiting period.

It is an object of the invention to provide networks with a different kind of collision treatment.

According to a first embodiment of the invention, this object is achieved by means of a network with at least one base station and a plurality of associated terminals for the exchange of payload data and control data, and with at least one common transmission channel which is provided for the access of several terminals, wherein the base station is provided for controlling the access to the common transmission channel, wherein the terminals are provided for sending at least an access signal to the base station for the purpose of obtaining access to the common transmission channel, and wherein at least two different start moments can be assigned to the terminals for transmitting their respective access signals.

Access signals are understood to be in general signals which the terminal sends to the base station before the terminal starts with the transmission of the actual data part. The terminals request, for example, a common transmission channel from the base station by means of the access signals. In addition, the access signals may also be used for avoiding collisions if several terminals want to access the same common transmission channel.

In general networks, a base station is understood to be a control station which controls the access to a common transmission channel of the network.

The network according to the invention is to be understood to be a wireless network with a plurality of radio cells, in each of which a base station and a plurality of terminals transmit control data and payload data in a wireless manner. A wireless transmission serves for the transfer of information, for example via radio, ultrasound, or infrared links. The invention, however, is also applicable to wired networks with at least one common transmission channel.

According to the invention, different start moments are assigned to the terminals associated with a base station for the purpose of sending the access signal. The start moments are defined in relation to a reference frame of the wireless network. Such a reference frame is always necessary for the synchronization of data coming from terminals and from the base station in TDMA, FDMA, and CDMA processes. Such a reference frame may comprise several sub-frames or may form a superframe together with other, consecutive frames. The reference frame may be, for example, the frame with a duration of 10 ms which is used in the UMTS system (UMTS=Universal Mobile Telecommunication System).

Such an arrangement of different start moments renders the base station capable of recognizing from the temporal position of the access signal within the reference frame which of the terminals has sent the access signal. The base station is capable of recognizing this on the basis of the different temporal positions of identical access signals even when several terminals send the same access signal and thus, for example, request the same common transmission channel, so that collisions are prevented. It is possible by means of the different start moments in sending of the access signal to realize an additional parameter for distinguishing the access signals sent by the terminals.

This renders it possible to implement various improved methods of dealing with collisions.

In an embodiment of the invention, it is provided that terminals which want to send messages via a common transmission channel first send a request signal to the base station. It is signaled to the base station by means of this request signal that the terminal wants to use a common transmission channel. The request signal may contain, for example, a bit of information as to which of the common transmission channels is requested or with what data rate the terminal wants to transmit via a common transmission channel.

In particular, the request signal may be an access preamble as described in the document 3GPP TS 25.211 V3.5.0, $3^{rd}$ Generation Partnership Project (3GPP) "Physical channels and mapping of transport channels onto physical channels (FDD)". In accordance therewith, the access preamble is transmitted several times at intervals, and the transmission power is raised until a positive acknowledge signal is sent by the base station to the terminal. It is signaled to the terminal by means this positive acknowledge signal that the signal sent by the terminal was received with a sufficient power by the base station. This method is also referred to as power ramping.

After a given time period has elapsed (time-out), it may be provided that neither a positive nor a negative acknowledge signal is sent. This is the case, for example, if the base station was incapable of detecting the transmitted preamble.

In the case of a positive acknowledge signal, the terminal can send the data part of the message packet with the transmission power thus adjusted. The base station, for example, sends a negative acknowledge signal if no or no sufficient channel capacity is available for the transmission of the data part, or if several terminals want to access the same common transmission channel. If a negative acknowledge signal is given, a renewed transmission attempt is made after a certain time, starting with the original starting transmission power which is then successively increased.

The assignment of different start moments for sending the request signal renders the base station capable of unequivocally detecting collisions after the reception of the request signals already. A fast and early recognition of collisions is thus possible, and various possibilities for collision management and collision resolution can be realized.

In an embodiment of the invention, the terminals send a collision elimination signal to the base station if the request signals received by the base station have led to collisions. This is the case, for example, when several terminals have sent the same request signal. This is detected by the base station on the basis of the different start moments of the request signals. A number of different collision elimination signals is provided for dealing with collisions, which signals are randomly selected by the terminals and sent to the base station. Collision elimination signals may be, for example, CR preambles (Collision Resolution Preambles), as described in more detail for the CPCH channel in the document 3GPP TS 25.211 V3.5.0, $3^{rd}$ Generation Partnership Project (3GPP) "Physical channels and mapping of transport channels onto physical channels (FDD)". Different, exclusively assigned start moments are provided also for the transmission of the collision resolution signals by the various terminals. If collisions arise once more in the transmission of the collision resolution signals, the base station can recognize this from the different start moments of the collision resolution signals. Such collisions in the collision resolution phase may occur, for example, when two terminals happen to select the same collision resolution signal or the same CR preamble. When a collision is detected in the collision resolution phase, the base station will send no acknowledge signal (zero transmission power) during a given time period to the terminals involved in the collision, i.e. to those terminals which accidentally chose the same collision resolution signal, or in an alternative implementation a negative acknowledge signal. Since the terminals receive no positive acknowledge signal, they will send no data part. Collisions can be fully avoided in this manner.

In an embodiment of the invention, the base station sends a collision detection signal to the terminals when the base station has detected colliding request signals. It is signaled to the terminals by means of the collision detection signals that a collision resolution phase is to be instituted and that the terminals should accordingly transmit collision resolution signals to the base station. The transmission of a separate collision detection signal as a preparation for the collision resolution signals has the advantage that it can be safeguarded thereby that a collision resolution phase is only started if it is absolutely necessary.

The separate collision detection signal may be implemented, for example, in that a CD/CA-ICH channel (Collision Detection/Collision Avoidance Indication Channel) in accordance with the document 3GPP TS 25.211 V3.5.0, $3^{rd}$ Generation Partnership Project (3GPP) "Physical channels and mapping of transport channels onto physical channels (FDD)", designed for a positive or negative acknowledgement of CR preambles, is used for this purpose only. The reduction of the CD/CA-ICH channels available for a positive or negative acknowledgement of CR preambles by one channel and the accompanying reduction of the available CR symbols by one symbol constitute no substantial limitation, because no undiscovered collisions can arise.

In an embodiment of the invention, a simple and reliable instruction by means of which the base station can control the access to the common transmission channel. It is safeguarded by means of this instruction that no collisions will occur during access to the common transmission channel. In addition, a sufficient reception power is safeguarded. The reference time frames of the wireless network are advantageously subdivided into access time frames so as to test whether the respective specific request signal was sent by only one terminal. The test as to whether the respective request signal was sent by only one terminal then takes place each time within the access time frame.

In an embodiment of the invention, the request signals are each unequivocally allocated to one common transmission channel. In this modification, the terminals can purposely request a certain common transmission channel by sending the corresponding request signal.

If the request signal allocated to a certain transmission channel was sent by only one terminal, and if furthermore this certain common transmission channel is not already in use, the base station can send a positive acknowledge signal to the terminal and release the common transmission channel for this terminal.

If the request signal allocated to such a certain transmission channel was sent by several terminals at different start moments, the base station will send a negative acknowledge signal to the terminals, thus preventing the access to the common transmission channel. Collisions are avoided thereby. The individual terminals should then once more transmit a request signal to the base station. It is alternatively possible to provide a collision resolution phase subsequent to the transmission of the negative acknowledge signals, in which phase the terminals send collision resolution signals to the base station.

In an embodiment of the invention, several request signals are allocated each time to one common transmission channel. In this modification, the base station can already eliminate certain collision situations after receiving the request signals. For example, if 16 different request signals are present, this set of 16 request signals may be subdivided into 4 sets of 4 request signals each. It is then possible to provide 4 common transmission channels such that 4 different request signals are allocated to each of the 4 common transmission channels.

Now if, for example, two different terminals send two different request signals, which are allocated to the same common transmission channel, the base station can send a positive acknowledge signal to the one terminal and a negative acknowledge signal to the other terminal. The collision risk is immediately eliminated thereby.

However, if two different terminals select the same request signal which is allocated to the same common transmission channel, the base station can merely recognize the collision, but it is not capable of achieving an immediate resolution of the collision. In this case the base station should send a negative acknowledge signal to the terminals.

The individual terminals should then once more send a request signal to the base station. It is alternatively possible to provide a collision resolution phase subsequent to the transmission of the negative acknowledge signal, in which phase the terminals send collision resolution signals to the base station.

A further possibility is that the request signal indicates merely a given data rate with which the terminal wants to transmit via a common transmission channel. The given common transmission channel is then allocated by the base station for the requested data rate.

In an embodiment of the invention, the terminals send the request signals only at the start of an access time frame each time. In this modification, the base station cannot detect collisions in the initial phase, in which the request signals are sent simultaneously in time by the terminals, i.e. it cannot be detected whether several terminals transmit the same request signal.

Access time frames are understood to be time frames at whose start all terminals are authorized to send a request signal.

An advantageous realization of the access time frame is found, for example, in that two consecutive reference frames of the UMTS system of 10 ms duration each are subdivided into 15 access time frames of equal length, of 5120 chips each.

Since collisions cannot be recognized in the initial phase, it is automatically provided in the case of a positive acknowledgement of a request signal that a collision resolution phase is carried out as the second phase. A set of different collision resolution signals is provided for eliminating collisions, which signals are randomly selected by the terminals and transmitted to the base station. Collision resolution signals may be, for example, CR preambles (Collision Resolution Preambles) which are described in more detail in the document 3GPP TS 25.211 V3.5.0, $3^{rd}$ Generation Partnership Project (3GPP) "Physical channels and mapping of transport channels onto physical channels (FDD)" for the CPCH. Different, exclusively allocated start moments are provided within the access time frame for each of the various terminals belonging to the group of users of the CPCH for the purpose of sending their respective collision resolution signals. If collisions arise once more in the transmission of the collision resolution signals, the base station is capable of detecting this from the different start moments of the collision resolution signals. Such collisions in the collision resolution phase may occur, for example, when two terminals happen to select the same collision resolution signal or the same CR Preamble. Upon recognizing a collision in the collision resolution phase, the base station will send no acknowledge signal (zero transmission power) within a given time period to those terminals which have accidentally chosen the same collision resolution signal, or will send a negative acknowledge signal in an alternative implementation. Since the terminals receive no positive acknowledge signal, they will send no data part. Collisions are completely avoided thereby.

The exclusive allotment of different start moments renders it possible for the base station to recognize from the position in time of the access signal within the reference frame which of the terminals has sent the access signal. Even if several terminals send the same access signal and thus request, for example, the same common transmission channel, this can still be detected by the base station from the different time positions of these identical access signals, so that collisions can be prevented. The term 'exclusive allotment' here means that each individual start moment is exclusively assigned to one terminal only.

In an embodiment of the invention, a combination of at least two collision resolution preambles and at least one start moment is allotted to the terminals, and similarly at least one start moment or access sub-frame is allotted for the access to the common transmission channel.

Such a combined allotment enhances the flexibility and the possible number of the terminals and renders a plurality of access processes possible.

The two different collision resolution preambles of reduce the likelihood that two terminals simultaneously send the same CR preamble. This likelihood is further reduced in an embodiment of the invention in that one individual combination of collision resolution preambles is assigned to each terminal.

In an embodiment of the invention, the nature of the access to the common transmission channel is modified in dependence on the number of terminals which are associated with this common transmission channel. If the number of terminals associated with a common transmission channel is not greater than the number of available preambles, then a preamble will advantageously be assigned to each of the terminals.

If the number of terminals exceeds the number of preambles, first an exclusive allotment of start moments or access sub-frames may be advantageous, provided the time spacing of the start moments or access sub-frames is not made too small by this. Combinations of start moments and sets of preambles are then advantageous in the case of a larger number of terminals.

A base station according to the invention, a terminal according to the invention, and a method according to the invention are also described.

The object of the invention is achieved in a further embodiment of the invention by means of a network.

The number of terminals associated with a common transmission channel is not greater than the number of preambles made available in this embodiment. This renders possible an exclusive assignment of the preambles. Collisions are fully prevented thereby.

Figure 2:
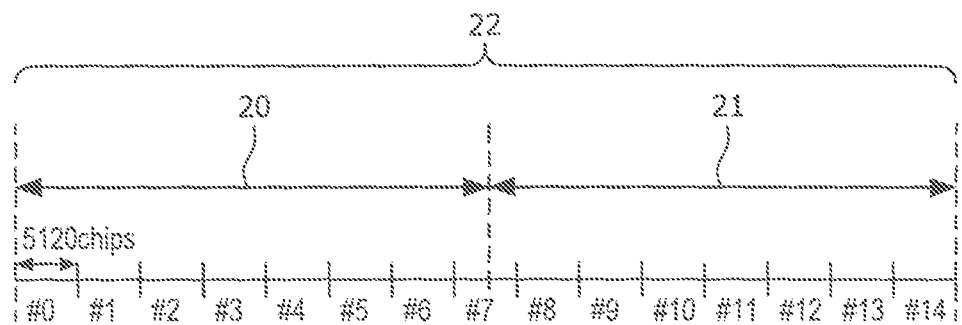
Figure 3A:
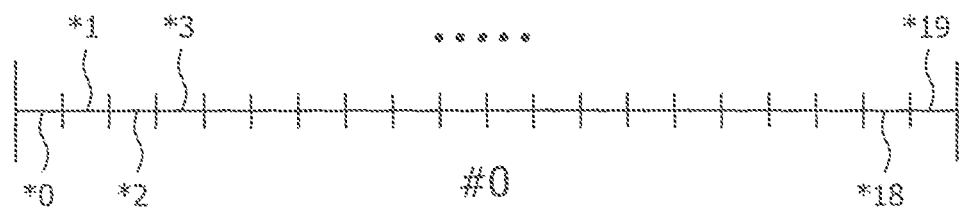
Figure 3B:
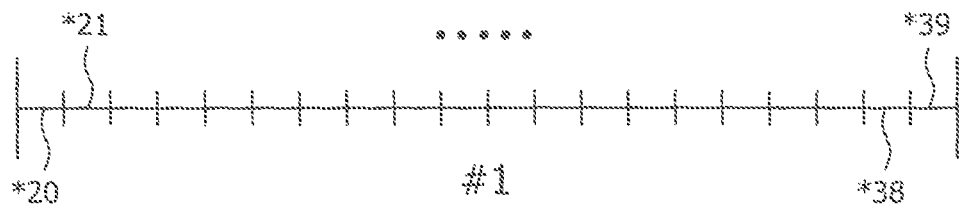
Figure 3C:
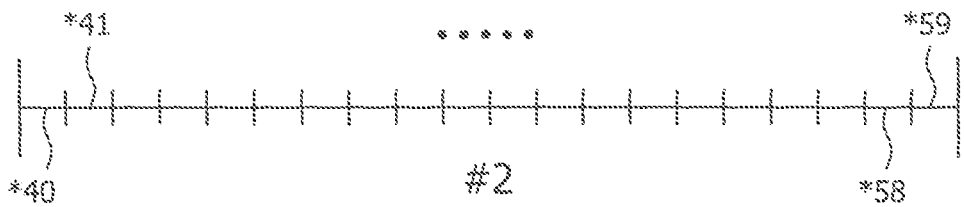
Figure 4:
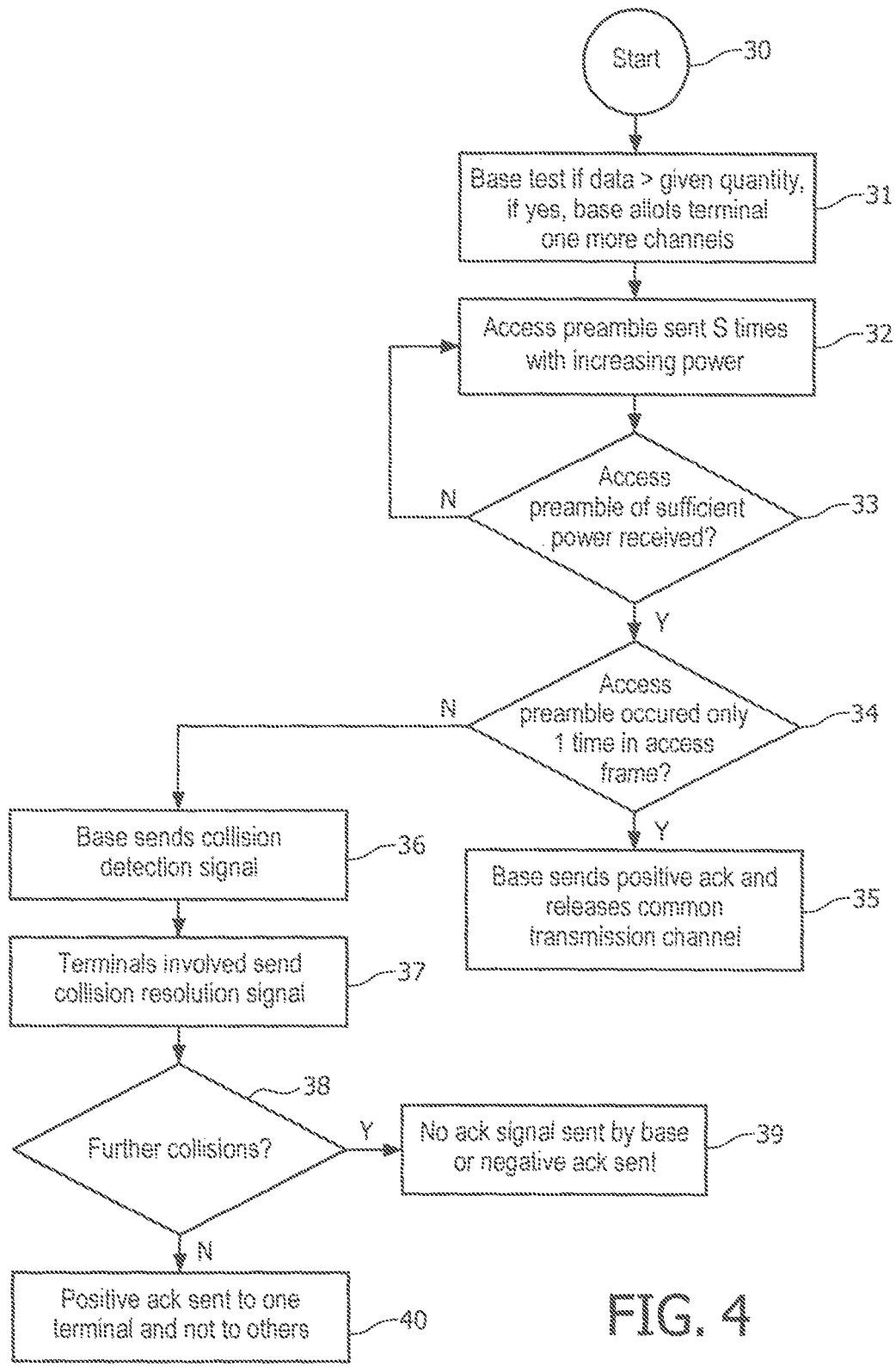
Figure 5:
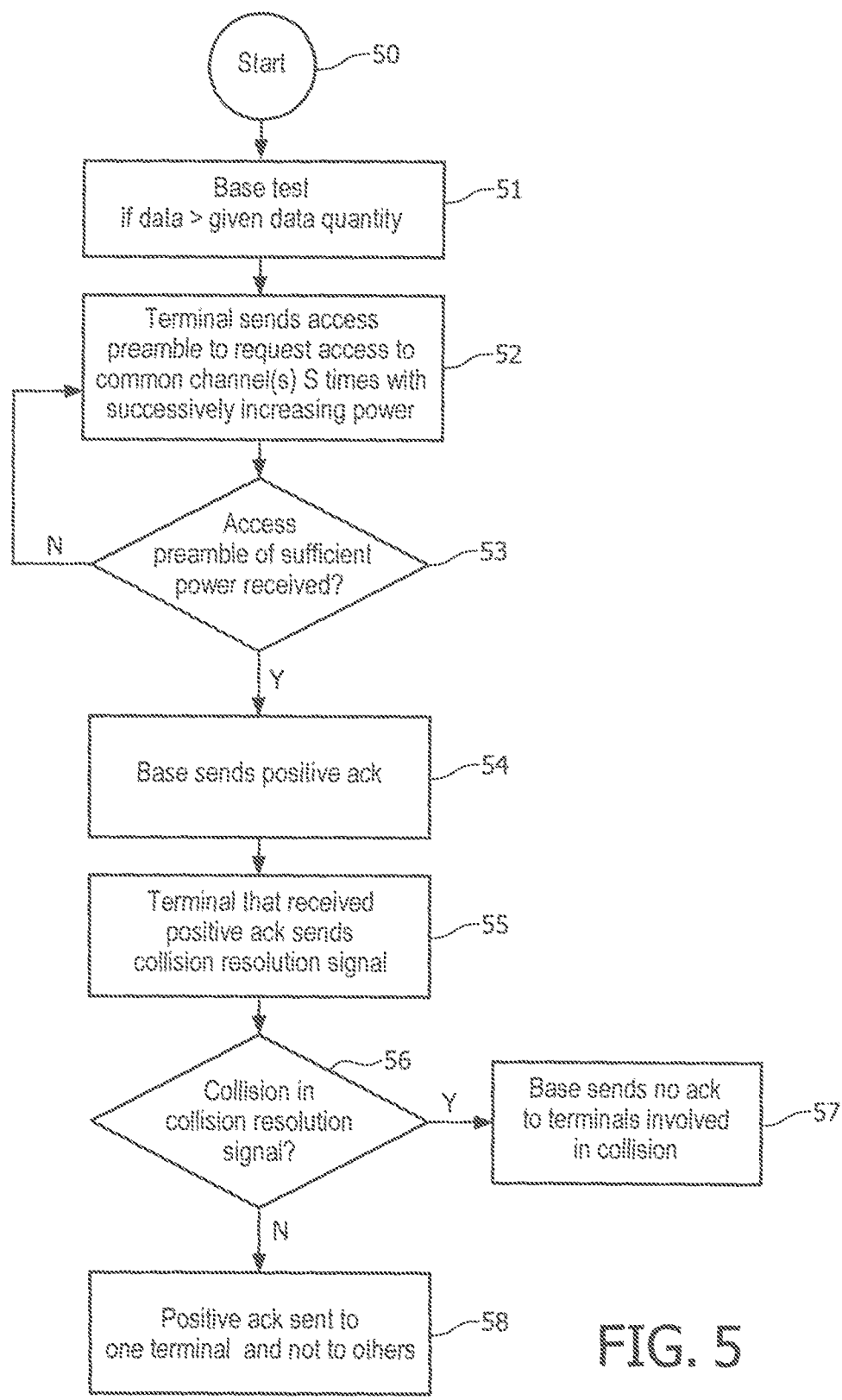

A few embodiments of the invention are shown diagrammatically in FIGS. 1 to 5 and will be explained in more detail with reference to said Figures, in which:

FIG. 1 shows a wireless network with a plurality of base stations and terminals, FIG. 2 shows two consecutive transmission frames in accordance with the UMTS standard, each of 10 ms duration, which two transmission frames are subdivided into 15 access frames of 5120 chips each, FIGS. 3a to 3c show three consecutive access frames, each subdivided into 20 access sub-frames (of 256 chips each), where the access sub-frames are each allocated to an individual terminal for transmitting an access signal, FIG. 4 is a flowchart for clarifying the allocation of a common transmission channel for the transmission of a data packet from a terminal in a first embodiment of the invention, and FIG. 5 is a flowchart for clarifying the allocation of a common transmission channel for the transmission of a data packet from a terminal in a second embodiment of the invention.

FIG. 1 shows a wireless network, for example a radio transmission network, with several base stations 1 to 3 and several terminals 4 to 14. Certain terminals 4 to 14 are allocated to a base station 1 to 3. In the example shown in FIG. 1, the terminals 4 to 7 are allocated to the base station 1, the terminals 8 to 10 to the base station 2, and the terminals 11 to 14 to the base station 3. Control data are exchanged at least between the base station and the terminals. An exchange of payload data may take place both between the base station and the terminals and also directly between the terminals. In either case the connection for the transmission of payload data is built up by the base station.

The terminals 4 to 14 will usually be mobile stations which are controlled by a fixedly installed base station 1 to 3. A base station 1 to 3, however, may also be movable or mobile in certain cases.

Radio signals in accordance with the FDMA, TDMA, or CDMA method (FDMA=frequency division multiplex access, TDMA=time division multiplex access, CDMA=code division multiplex access), for example, or a combination of methods are transmitted in the wireless network.

In the CDMA method, which is a special code spreading protocol, a quantity of binary information (data signal) originating from a user is modulated each time by means of a different code sequence. Such a code sequence consists of a pseudo-random square-wave signal (pseudo-noise code) whose rate, also referred to as chip rate, is usually much higher than that of the binary information. The duration of a square-wave pulse of the pseudo-random square-wave signal is denoted the chip interval $T_C$. $1/T_C$ is the chip rate. The multiplication or modulation of the data signal by the pseudo-random square-wave signal results in a spreading of the spectrum by a spreading factor $N_C=T/T_C$, where T is the duration of a square-wave pulse of the data signal.

Payload data and control data are transmitted between at least one terminal and a base station via channels allocated by the base station. A channel is defined by a frequency range, a time range, and, for example, a spreading code in the case of the CDMA method. The radio link from the base station to the terminals is denoted the downlink, and from the terminals to the base station the uplink. Data are thus sent from the base station to the terminals through downlink channels, and from the terminals to the base station through uplink channels. For example, a downlink control channel may be provided which is used for distributing control data from the base station to all terminals prior to the establishment of a connection. Such a channel is denoted the broadcast control channel or downlink distribution control channel. To transmit control data prior to the establishment of a connection from a terminal to the base station, for example, an uplink control channel allocated by the base station may be used, to which, however, other terminals also have access. An uplink channel which can be used by several or all terminals is denoted a common uplink channel. After a connection has been established, for example between a terminal and the base station, payload data are transmitted through a downlink and an uplink payload channel. Channels which are built up only between a transmitter and a receiver are denoted dedicated channels. Usually, a payload channel is a dedicated channel which can be accompanied by a dedicated control channel for the transmission of control data specific to the connection.

The wireless network has common transmission channels for data transmission between the base station and the terminals, which channels are provided for the shared use by several terminals in dependence on demand. Such common transmission channels may be, for example, the channels denoted CPCH channels (Common Packet Channels) in the document 3GPP TS 25.211 V3.5.0, 3$^{rd}$ Generation Partnership Project (3GPP) "Physical channels and mapping of transport channels onto physical channels (FDD)", or alternatively RACH channels (Random Access Channels). The access to these common transmission channels is controlled by the base station.

It is necessary, if payload data are to be exchanged between the base station and a terminal, that the terminal is synchronized with the base station. It is known, for example, from the GSM system (GSM=Global System for Mobile communication), in which a combination of FDMA and TDMA methods is used, that after the determination of a suitable frequency range the position in time of a frame is determined on the basis of given parameters (frame synchronization), by means of which the time sequence for the transmission of data is obtained. Such a frame is always necessary for the data synchronization of terminals and base station in the case of TDMA, FDMA, and CDMA methods. Such a frame may contain various sub-frames, or may form a superframe together with several other, consecutive frames. The following description will be based on one frame, denoted the reference frame, for simplicity's sake. This reference frame may be, for example, the frame having a duration of 10 ms in the UMTS system (UMTS=Universal Mobile Telecommunication System).

If a frame synchronization is to be carried out, all terminals should be synchronized with the base station by means of pulses transmitted by the base station. If no code spreading method (for example the CDMA method) is used (for example, a TDMA method is used), the pulse duration corresponds exactly to the time interval necessary for the transmission of one bit. If a code spreading method is used, the pulse duration corresponds to one chip interval. A bit interval then equals several chip intervals. The transmission of a special pulse sequence by the base station is necessary for frame synchronization. The start moment of the pulse sequence corresponds to the start moment of a frame.

FIG. 2 shows two consecutive radio transmission frames 20 and 21 in accordance with the UMTS standard, each of 10 ms duration. They form a double transmission frame 22. The two transmission frames 20 and 21 are subdivided jointly into 15 access frames #0 to #14. The transmission frame 20 comprises the access frames #0 to #6 plus the first half of the access frame #7. The transmission frame 21 comprises the access frames #8 to #14 and the second half of the access frame #7. Each of the access frames #0 to #14 is 5120 chips long.

FIGS. 3*a* to 3*c* show the three consecutive access frames #0 to #2 of FIG. 2, which are each subdivided into 20 access sub-frames. The access frame #0 in FIG. 3*a* is subdivided into 20 access sub-frames ***0 to ***19, the access frame #1 of FIG. 3*b* is subdivided into 20 access sub-frames ***20 to ***39, and the access frame #2 of FIG. 3*c* is subdivided into 20 access sub-frames ***40 to ***59. The access sub-frames may each be allocated to an individual terminal for the transmission of access signals. Thus, for example, the terminal 4 may be joined to the access sub-frame ***0 in the system of FIG. 1, the terminal 5 to the access sub-frame ***1, the terminal 6 to the access sub-frame ***2, the terminal 7 to the access sub-frame ***3, and in a similar manner the terminals 8 to 10 to the access sub-frames ***4 to ***6, and the terminals 11 to 14 to the access sub-frames ***7 to ***10.

In this example, therefore, a total of 60 access sub-frames is provided, so that it is possible to provide 60 different terminals with an access sub-frame and thus with an individual, exclusively reserved start moment for sending the access signals.

The assignment of the access sub-frames is periodically repeated in a corresponding manner in the subsequent access frames #3 to #5, #6 to #8, #9 to #11, and #12 to #14, i.e. the access frame #3 is subdivided into the 20 access sub-frames ***0 to ***19, the access frame #4 into the 20 access sub-frames ***20 to ***39, the access frame #5 into the 20 access sub-frames ***40 to ***59, and the access frame #6 into the 20 access sub-frames ***0 to ***19, and so on. The individual access sub-frames thus reappear periodically after every 3 access frames. This renders it possible to traverse the access sub-frames *0 to *59 five times during a period of 2 radio transmission frames 20 and 21 having a total length of 20 ms.

This is necessary for the so-called power ramping. The transmission power of the access signals can be increased within two radio transmission frames after every three access frames, i.e. four times, until the reception power arriving at the base station is sufficiently high. The power ramping may be continued, if so desired, also in the subsequent transmission frames.

It is provided in a first embodiment of the invention that the individual terminals send the request signals, by means of which the terminals request a common transmission channel from the base station, already during the access sub-frame allotted to the terminal. The request signals sent are, for example, access preambles. The access preambles may either be assigned to a specific common transmission channel, or a group of access preambles is assigned to an individual common transmission channel each time.

If the terminal 4 of FIG. 1 is associated with the access sub-frame *0, as in the example given above, this terminal can transmit an access preamble in the access sub-frame *0 of the access frames #0, #3, #6, #9, and #12 five times, such that the transmission power is successively raised in each step. Five power ramping steps are thus possible in total in this example.

In the first embodiment of the invention, it may be favorable for simplifying the evaluation that the terminals start sending access preambles only at the start of a double transmission frame of 20 ms duration, i.e. only in the access frames #0 to #2.

When a terminal allocated by the network to the group of the users of the common transmission channel denoted CPCH wants to send a message packet via the CPCH after synchronization, various steps are carried through in the terminal as indicated in a flowchart in FIG. 4 for the first embodiment of the invention.

Block 30 in FIG. 4 shows the start of the flowchart. In block 31, the base station tests whether the data required for transmission from a terminal exceed a given data quantity. If this is the case, the base station allots to the relevant terminal one or several common transmission channels for a possible access. This authorizes the terminal to access the common transmission channel or channels, if so desired. At the same time, the base station assigns to the relevant terminal an access sub-frame within which the terminal can send request signals for requesting a common transmission channel to the base station. An individual start moment is laid down within the radio transmission frame for each terminal for the purpose of sending the request signals.

If a terminal wants to avail itself of one of the common transmission channels assigned to it, it sends an access preamble by way of a request signal to the base station in block 32.

It is provided in block 32 that the access preamble is transmitted up to five times at time intervals of 3 access frames each time, during which the transmission power is successively increased. It is safeguarded thereby that the base station will receive the signals from the terminal with a sufficient power (power ramping).

Each terminal sends the access preamble within the access sub-frame assigned to it by the base station, while it may be favorable for simplifying the evaluation that the terminals are only allowed to start transmitting at the start of a double transmission frame of 20 ms duration, i.e. only within the access frames #0 to #2 in FIG. 2.

The base station tests in block 33 whether at least one access preamble of sufficient power was received.

If this is the case, it is tested in the next block 34 whether the respective access preamble has occurred only once within the relevant access frame.

If this condition is also met, the base station sends a positive acknowledge signal to the relevant terminal, for example two access frames later, and thus releases the common transmission channel belonging to the access preamble to this terminal. This is represented by block 35.

If in the above example the terminal 4 sends an access preamble of sufficient transmission power in the access sub-frame *0 of the access frame #0, while this access preamble is not transmitted by another terminal in the access frame #0 during an access sub-frame *1 to *19, then the base station will send a positive acknowledge signal to the terminal 4, for example two access frames later, i.e. during the access frame #2. In this case, the terminal 4 thus already has received a positive acknowledge signal before the access frame #3, when a renewed transmission of the access preamble with increased transmission power would be envisaged. As a result of this, the terminal 4 can start transmitting the data part via the common transmission channel allotted to the access preamble.

If an access preamble is not received with sufficient power within the access frames #0 to #2, the terminal will not receive a positive or negative acknowledge signal from the base station, and a return loop is made to block 32. The terminal will accordingly transmit the access preamble once more at an increased power level within the subsequent access frames #0 to #5, each time within that access sub-frame *0 to *59 which is assigned to the terminal.

This stepping up of the transmission power will be repeated, if necessary, during the access frames #6 to #8, #9 to #11, and #12 to #14.

If one or several access preambles of sufficient power were received, but the respective access preambles had occurred at least twice within the respective access frame, i.e. were sent by at least two different terminals within the access time frame at different start moments, then the collision resolution phase must be initiated.

The decision as to whether a collision resolution phase is necessary is made by the base station. Once the base station has detected a collision during the reception of the access preambles and accordingly a collision resolution phase is to be carried through, the base station will send a collision detection signal to the terminals. This is provided for in block 36. It is signaled to the terminals by means of the collision recognition signals sent in block 36 that the initiation of a collision resolution phase is necessary and that the terminals must send collision resolution signals to the base station.

The individual collision detection signal may be implemented, for example, in that a CD/CA-ICH channel (Collision Detection/Collision Avoidance Indication Channel) in accordance with the document 3GPP TS 25.211 V3.5.0, 3$^{rd}$ Generation Partnership Project (3GPP) "Physical channels and mapping of transport channels onto physical channels (FDD)" is used, which channel is designed for a positive acknowledgement or non-acknowledgement (zero transmission power within a given time period) of CR preambles. The reduction of the CD/CA-ICH channels available for the positive acknowledgement or non-acknowledgement of CR preambles by one channel, and the accompanying reduction of the available CR symbols by one symbol do not represent a substantial limitation, because no undiscovered collisions can occur.

In the next block 37, the terminals each send a collision resolution signal to the base station. A set of different collision resolution signals is provided for the elimination of collisions, from which a random choice is made by the terminals for transmission to the base station. Collision resolution signals may be, for example, CR preambles (Collision Resolution Preambles). Different start moments are reserved for each of the various terminals again also for sending the collision resolution signals. It is now tested in block 38 by the base station whether collisions have again occurred during the transmission of the collision resolution signals. The base station is capable of detecting this from the different start moments of the collision resolution signals, each start moment being exclusively and unequivocally assigned to one terminal. Such collisions in the collision resolution phase may occur, for example, when two terminals happen to select the same collision resolution signal or the same CR preamble.

During the recognition of a collision in the collision resolution phase, the base station will send no acknowledge signal (zero transmission power) to the terminals involved in the collision in block 39, i.e. to those terminals which happened to pick the same collision resolution signal, within a given time period, or in an alternative implementation it will send a negative acknowledge signal. Since the terminals receive no positive acknowledge signal, they will send no data on the common transmission channel. Collisions can be fully avoided in this manner. The terminals involved must request a common transmission channel once more in this case by means of a repeated transmission of the access signals or access preambles.

If no collisions have occurred in the collision resolution phase, the base station sends a positive acknowledge signal for one of the CR preambles in block 40 and no acknowledge signal (zero transmission power) for the remaining CR preambles within a given time period, or in an alternative implementation a negative acknowledge signal. The terminal which has sent the positively acknowledged CR preamble is thereby authorized to use the common transmission channel. The terminals whose CR preambles did not receive an acknowledge signal (zero transmission power) within a given time period, or in an alternative implementation received a negative acknowledge signal, must request a common transmission channel once more in that they once more send the access signals or access preambles.

This first embodiment renders it possible in principle that under certain circumstances more than one terminal can receive a positive acknowledge signal in response to the transmitted CR preamble, provided no collision occurs, so that two or more terminals can proceed with sending their respective data parts: for example, if a terminal A and a terminal B send the same access preamble P1, and a terminal C and a terminal D the same access preamble P2 to their respective exclusive access sub-frames, the two access preambles may be given a positive acknowledge signal, while it is indicated at the same time that a collision resolution phase is to follow. The base station now knows from the phase in which the access preambles were sent which terminals compete with one another for the same common transmission channel (the CPCH in the UMTS). If the terminals competing for the same common transmission channel (terminals A and B, and terminals C and D in this case) send different collision resolution preambles in the collision resolution phase (for example, terminal A sends collision resolution preamble K1, terminal B sends K2, terminal C sends K2, and terminal D sends K3), the base station can answer, for example, the collision resolution preamble K2 with a positive acknowledgement, which is directed to terminal B and terminal C, whereas K1 and K3 are not acknowledged. Since terminal B and terminal C do not compete for the same common transmission channel, they can send their two data parts simultaneously. Alternatively, the base station could positively acknowledge K1 and K3, and not acknowledge K2, so that terminal A and terminal D are allowed to transmit their data parts over different common transmission channels.

FIG. 5 is a flowchart representing a second embodiment of the invention. In this second embodiment of the invention, the access preambles are sent uniformly by all terminals only at the start of an access frame. There is no assignment of individual start moments to the terminals within the access frame for sending the access preambles in this second embodiment. A collision resolution phase is provided in all cases in this second embodiment, wherein different start moments are exclusively assigned to the individual terminals within the access frame for sending the collision resolution signals.

Block 50 in FIG. 5 shows the start of the flowchart. In block 51, it is tested by the base station whether the quantity of data which a terminal wants to transmit exceeds a given data quantity. If this is the case, the base station allots to the respective terminal one or several common transmission channels for a possible access. This enables the terminal to access the common transmission channel or channels assigned to it, if so desired. At the same time, the base station assigns to the respective terminal an access sub-frame within which the terminal is allowed to send the collision resolution signals to the base station. An individual start moment is fixed thereby within the radio transmission frame for each terminal for the purpose of transmitting the collision resolution signals. Such a method is described, for example, in the document "CPCH Access procedures", Golden Bridge Technologies, Tdoc TSGR2#5(99)598, TSG-RAN-WG2#5, Sophia Antipolis, France, Jul. 5-9, 1999.

If a terminal wishes to access one of the common transmission channels assigned to it, it will send an access preamble as a request signal to the base station in block 52.

Block 52 provides the possibility of sending the access preamble up to five times at time intervals of 3 access frames each time, during which the transmission power is successively raised. It is safeguarded thereby that the base station will receive the signals from the terminal with a sufficient power level (power ramping).

Each terminal in this second embodiment of the invention is allowed to send an access preamble only at each start of one of the access frames #0 to #14 of FIG. 2. It is accordingly not provided for in this embodiment that individual start moments are assigned to the terminals within the access frames for sending the access preambles.

In block 53, the base station tests at the start of each access frame whether an access preamble was received with sufficient power.

If this is the case, the base station will send a positive acknowledge signal to the relevant terminal in block 54, for example two access frames later.

If no access preamble was received with a sufficient power level, the terminal will receive no positive acknowledge signal from the base station, and a return is made to block 52. Accordingly, the terminal will send the access preamble once more with an increased power three access frame later.

This increase in the transmission power is repeated up to four times, as necessary.

Since collisions could not be detected in the first phase of the access procedure, in which the access preambles were sent, because of the uniform moment of transmission of the terminals, it is automatically provided in the case of a positive acknowledgement of an access preamble that a collision resolution phase is carried through as a second phase. An initiation of the collision resolution phase by the base station through the transmission of collision detection signals is not necessary in this second embodiment of the invention.

Terminals which have received a positive acknowledge signal after sending an access preamble will automatically send a collision resolution signal to the base station in block 55. A set of various collision resolution signals is provided for the purpose of collision resolution, from which the terminals make a random choice and send the chosen signal to the base station. Collision resolution signals may be, for example, CR preambles (Collision Resolution Preambles). The various terminals have, for example, 20 different start moments available to them within the access frame for sending the collision resolution signals, such that a start moment is exclusively allotted to a terminal.

It is tested by the base station in block 56 whether collisions have once more occurred in the transmission of the collision resolution signals. The base station is capable of deriving this from the different start moments of the collision resolution signals. Such collisions in the collision resolution phase may occur, for example, when two terminals accidentally select the same collision resolution signal or the same CR preamble.

After detecting a collision in the collision resolution phase, the base station sends no acknowledge signal (zero transmission power) to the terminals involved in the collision in block 57, i.e. to those terminals which happened to select the same collision resolution signal, or in an alternative embodiment it sends a negative acknowledge signal. Since they do not receive a positive acknowledge signal, the terminals send no data over the common transmission channel. Collisions can be fully prevented in this manner. The terminals involved must request a common transmission channel once more in this case by means of a repeated transmission of the access signals or access preambles.

If no collisions have occurred in the collision resolution phase, the base station will send a positive acknowledge signal in response to one of the CR preambles in block 58, and no acknowledge signal (zero transmission power) in response to the other CR preambles within a given time period, or alternatively in another implementation a negative acknowledge signal. This allows the terminal which has sent the CR preamble with the positive acknowledgement to utilize the common transmission channel. The terminals whose CR preambles received no acknowledge signal (zero transmission power) within a given time interval, or in an alternative implementation a negative acknowledge signal, must request a common transmission channel once more by means of a repeated transmission of the access signals or access preambles.

Further embodiments of the invention relate to networks in which an increased number of terminals can be assigned to a common transmission channel or to a set of common transmission channels, while the number of access sub-frames remains the same.

One possibility here is to subdivide the, for example, 16 available collision resolution preambles into 2, 4, or 8 sub-sets of 8, 4, or 2 collision resolution preambles each. A sub-set of collision resolution preambles and a start moment or access sub-frame are then assigned to each terminal for sending the collision resolution preambles in this embodiment. This embodiment thus renders it possible for terminals which were given different sub-sets to use the same start moment or the same access sub-frame for sending the collision resolution preambles. The result of this is that, given 20 access sub-frames, 40, 80, or 160 terminals can be authorized to use a common transmission channel or a set of common transmission channels.

The following Tables show examples of the assignment of the individual terminals to a start moment or access sub-frame and to a sub-set of collision resolution preambles in the case of 20, 40, 80, and 160 terminals allocated the use of one set of common transmission channels (CPCH). The individual terminals were given the designation UE (User Equipment).

TABLE 1

A maximum of 20 terminals (UE1 to UE20) can be assigned to one set of common transmission channels (CPCH set).

|  | UE1 | UE2 | UE3 | UE4 | UE5 | UE6 | UE7 | UE8 | UE9 | UE10 |
|---|---|---|---|---|---|---|---|---|---|---|
| Access sub-frame | 1 | 2 | 3 | 4 | 5 | 6 | 7 | 8 | 9 | 10 |
| Collision resolution preamble to be chosen | 1...16 | 1...16 | 1...16 | 1...16 | 1...16 | 1...16 | 1...16 | 1...16 | 1...16 | 1...16 |

|  | UE11 | UE12 | UE13 | UE14 | UE15 | UE16 | UE17 | UE18 | UE19 | UE20 |
|---|---|---|---|---|---|---|---|---|---|---|
| Access sub-frame | 11 | 12 | 13 | 14 | 15 | 16 | 17 | 18 | 19 | 20 |
| Collision resolution preamble to be chosen | 1...16 | 1...16 | 1...16 | 1...16 | 1...16 | 1...16 | 1...16 | 1...16 | 1...16 | 1...16 |

TABLE 2

A maximum of 40 terminals (UE1 to UE40) can be assigned to a CPCH set.

|  | UE1 | UE2 | UE3 | UE4 | UE5 | UE6 | UE7 | UE8 | UE9 | UE10 |
|---|---|---|---|---|---|---|---|---|---|---|
| Access sub-frame | 1 | 2 | 3 | 4 | 5 | 6 | 7 | 8 | 9 | 10 |
| Collision resolution | 1...8 | 1...8 | 1...8 | 1...8 | 1...8 | 1...8 | 1...8 | 1...8 | 1...8 | 1...8 |

TABLE 2-continued

A maximum of 40 terminals (UE1 to UE40) can be assigned to a CPCH set.

preamble to be chosen

| | UE11 | UE12 | UE13 | UE14 | UE15 | UE16 | UE17 | UE18 | UE19 | UE20 |
|---|---|---|---|---|---|---|---|---|---|---|
| Access sub-frame | 11 | 12 | 13 | 14 | 15 | 16 | 17 | 18 | 19 | 20 |
| Collision resolution preamble to be chosen | 1...8 | 1...8 | 1...8 | 1...8 | 1...8 | 1...8 | 1...8 | 1...8 | 1...8 | 1...8 |

| | UE21 | UE22 | UE23 | UE24 | UE25 | UE26 | UE27 | UE28 | UE29 | UE30 |
|---|---|---|---|---|---|---|---|---|---|---|
| Access sub-frame | 1 | 2 | 3 | 4 | 5 | 6 | 7 | 8 | 9 | 10 |
| Collision resolution preamble to be chosen | 9...16 | 9...16 | 9...16 | 9...16 | 9...16 | 9...16 | 9...16 | 9...16 | 9...16 | 9...16 |

| | UE31 | UE32 | UE33 | UE34 | UE35 | UE36 | UE37 | UE38 | UE39 | UE40 |
|---|---|---|---|---|---|---|---|---|---|---|
| Access sub-frame | 11 | 12 | 13 | 14 | 15 | 16 | 17 | 18 | 19 | 20 |
| Collision resolution preamble to be chosen | 9...16 | 9...16 | 9...16 | 9...16 | 9...16 | 9...16 | 9...16 | 9...16 | 9...16 | 9...16 |

TABLE 3

A maximum of 80 terminals (UE1 to UE80) can be assigned to a CPCH set.

| | UE1 | UE2 | UE3 | UE4 | UE5 | UE6 | UE7 | UE8 | UE9 | UE10 |
|---|---|---|---|---|---|---|---|---|---|---|
| Access sub-frame | 1 | 2 | 3 | 4 | 5 | 6 | 7 | 8 | 9 | 10 |
| Collision resolution preamble to be chosen | 1...4 | 1...4 | 1...4 | 1...4 | 1...4 | 1...4 | 1...4 | 1...4 | 1...4 | 1...4 |

| | UE11 | UE12 | UE13 | UE14 | UE15 | UE16 | UE17 | UE18 | UE19 | UE20 |
|---|---|---|---|---|---|---|---|---|---|---|
| Access sub-frame | 11 | 12 | 13 | 14 | 15 | 16 | 17 | 18 | 19 | 20 |
| Collision resolution preamble to be chosen | 1...4 | 1...4 | 1...4 | 1...4 | 1...4 | 1...4 | 1...4 | 1...4 | 1...4 | 1...4 |

| | UE21 | UE22 | UE23 | UE24 | UE25 | UE26 | UE27 | UE28 | UE29 | UE30 |
|---|---|---|---|---|---|---|---|---|---|---|
| Access sub-frame | 1 | 2 | 3 | 4 | 5 | 6 | 7 | 8 | 9 | 10 |
| Collision resolution preamble to be chosen | 5...8 | 5...8 | 5...8 | 5...8 | 5...8 | 5...8 | 5...8 | 5...8 | 5...8 | 5...8 |

| | UE31 | UE32 | UE33 | UE34 | UE35 | UE36 | UE37 | UE38 | UE39 | UE40 |
|---|---|---|---|---|---|---|---|---|---|---|
| Access sub-frame | 11 | 12 | 13 | 14 | 15 | 16 | 17 | 18 | 19 | 20 |
| Collision resolution preamble to be chosen | 5...8 | 5...8 | 5...8 | 5...8 | 5...8 | 5...8 | 5...8 | 5...8 | 5...8 | 5...8 |

| | UE41 | UE42 | UE43 | UE44 | UE45 | UE46 | UE47 | UE48 | UE49 | UE50 |
|---|---|---|---|---|---|---|---|---|---|---|
| Access sub-frame | 1 | 2 | 3 | 4 | 5 | 6 | 7 | 8 | 9 | 10 |
| Collision resolution preamble to be chosen | 9...12 | 9...12 | 9...12 | 9...12 | 9...12 | 9...12 | 9...12 | 9...12 | 9...12 | 9...12 |

| | UE51 | UE52 | UE53 | UE54 | UE55 | UE56 | UE57 | UE58 | UE59 | UE60 |
|---|---|---|---|---|---|---|---|---|---|---|
| Access sub-frame | 11 | 12 | 13 | 14 | 15 | 16 | 17 | 18 | 19 | 20 |
| Collision resolution preamble to be chosen | 9...12 | 9...12 | 9...12 | 9...12 | 9...12 | 9...12 | 9...12 | 9...12 | 9...12 | 9...12 |

| | UE61 | UE62 | UE63 | UE64 | UE65 | UE66 | UE67 | UE68 | UE69 | UE70 |
|---|---|---|---|---|---|---|---|---|---|---|
| Access sub-frame | 1 | 2 | 3 | 4 | 5 | 6 | 7 | 8 | 9 | 10 |
| Collision resolution preamble to be chosen | 13...16 | 13...16 | 13...16 | 13...16 | 13...16 | 13...16 | 13...16 | 13...16 | 13...16 | 13...16 |

| | UE71 | UE72 | UE73 | UE74 | UE75 | UE76 | UE77 | UE78 | UE79 | UE80 |
|---|---|---|---|---|---|---|---|---|---|---|
| Access sub-frame | 11 | 12 | 13 | 14 | 15 | 16 | 17 | 18 | 19 | 20 |
| Collision resolution preamble to be chosen | 13...16 | 13...16 | 13...16 | 13...16 | 13...16 | 13...16 | 13...16 | 13...16 | 13...16 | 13...16 |

In a further embodiment of the invention, the available collision resolution preambles are directly and exclusively assigned to the terminals, provided the number of available collision resolution preambles is smaller than or equal to the number of terminals which were allotted a common transmission channel or a set of common transmission channels (CPCH). For example, if 16 collision resolution preambles are available, one collision resolution preamble is exclusively assigned to each terminal if there are not more than 16 terminals in the user group of the CPCH set. This simplifies the implementation of the collision resolution in the case of a small number of terminals.

In a further embodiment of the invention, the access frames are each subdivided into a small number of subframes only, for example into 2, 3, or 4 sub-frames. This facilitates the synchronization between the transmitter and the receiver with respect to the access sub-frames.

For example, if 2 access sub-frames are provided, 32 terminals can be subdivided into 2 sub-sets of 16 UEs each, such that the 16 terminals of the first sub-set are allocated the first access sub-frame and each a respective exclusive collision resolution preamble. Similarly, the 16 terminals of the second sub-set are allocated the second access sub-frame and each a respective exclusive collision resolution preamble.

It is indeed true that two terminals then have one collision resolution preamble in common, i.e. one terminal from the first sub-set and one terminal from the second sub-set. Should these two terminals happen to require the common transmission channel at the same moment, the resulting collision can be recognized from the different access subframes or start moments, but it cannot be resolved. This means that the access to the common transmission channel must be refused to both terminals.

possibility is available, i.e. that at least two collision resolution preambles are available for selection to each terminal. Each of the four access sub-frames has 8 terminals assigned to it, such that one pair of collision resolution preambles is assigned to each terminal. Each access sub-frame forms a set together with the associated terminals and the collision resolution preambles assigned to these terminals. The pairs of collision resolution preambles belonging to the individual terminals are advantageously chosen such that they differ from all other pairs. this improves the randomizing and thus reduces the likelihood of a collision taking place. The improved randomizing will become clear from the following example: two terminals A and B of a radio cell attempt repeatedly to access a common transmission channel with a high data rate. If these terminals A and B were given the same pair of collision resolution preambles CR1 and CR2, any occurring collision cannot be resolved if they both choose CR1 or CR2.

If CR1 and CR2 are assigned to terminal A and CR2 and CR3 to terminal B, however, a collision cannot be resolved only in the situation in which the terminal A and the terminal B both choose CR1. CR3 is additionally assigned to a further terminal.

An example of 4 access sub-frames is shown in Table 4. The terminals UE1 to UE8 are associated with a first access sub-frame and form the set 1; the terminals UE 9 to UE16 are associated with a second access sub-frame and form the set 2; the terminals UE 17 to UE24 are associated with a third access sub-frame and form the set 3; and the terminals UE 25 to UE32 are associated with a fourth access sub-frame and form the set 4. Each of the terminals 1 to 32 is assigned a distinct pair of collision resolution preambles.

TABLE 4

Each set corresponds to an access sub-frame.

| | CR preamble | | | CR preamble | | | CR preamble | | | CR preamble | |
| --- | --- | --- | --- | --- | --- | --- | --- | --- | --- | --- | --- |
| Set1 | 1rst | 2nd | Set2 | 1rst | 2nd | Set3 | 1rst | 2nd | Set4 | 1rst | $2^{nd}$ |
| UE1 | 1 | 2 | UE9 | 1 | 4 | UE17 | 1 | 6 | UE25 | 1 | 8 |
| UE2 | 3 | 4 | UE10 | 3 | 6 | UE18 | 3 | 8 | UE26 | 3 | 10 |
| UE3 | 5 | 6 | UE11 | 5 | 8 | UE19 | 5 | 10 | UE27 | 5 | 12 |
| UE4 | 7 | 8 | UE12 | 7 | 10 | UE20 | 7 | 12 | UE28 | 7 | 14 |
| UE5 | 9 | 10 | UE13 | 9 | 12 | UE21 | 9 | 14 | UE29 | 9 | 16 |
| UE6 | 11 | 12 | UE14 | 11 | 14 | UE22 | 11 | 16 | UE30 | 11 | 2 |
| UE7 | 13 | 14 | UE15 | 13 | 16 | UE23 | 13 | 2 | UE31 | 13 | 4 |
| UE8 | 15 | 16 | UE16 | 15 | 2 | UE24 | 15 | 4 | UE32 | 15 | 6 |

In an embodiment of the invention, at least 4 access sub-frames are provided so as to achieve that the number of terminals in the user group of a common transmission channel is doubled while at the same time a randomizing A similar subdivision into 8 access sub-frames is shown in Table 5. A total of 64 terminals can be assigned in the case of 8 access sub-frames, each terminal being capable of choosing between two collision resolution preambles.

TABLE 5

Each set corresponds to an access sub-frame.

| | CR preamble | | | CR preamble | | | CR preamble | | | CR preamble | |
| --- | --- | --- | --- | --- | --- | --- | --- | --- | --- | --- | --- |
| Set1 | 1rst | 2nd | Set2 | 1rst | $2^{nd}$ | Set3 | 1rst | 2nd | Set4 | 1rst | 2nd |
| UE1 | 1 | 2 | UE9 | 1 | 4 | UE17 | 1 | 6 | UE25 | 1 | 8 |
| UE2 | 3 | 4 | UE10 | 3 | 6 | UE18 | 3 | 8 | UE26 | 3 | 10 |
| UE3 | 5 | 6 | UE11 | 5 | 8 | UE19 | 5 | 10 | UE27 | 5 | 12 |
| UE4 | 7 | 8 | UE12 | 7 | 10 | UE20 | 7 | 12 | UE28 | 7 | 14 |
| UE5 | 9 | 10 | UE13 | 9 | 12 | UE21 | 9 | 14 | UE29 | 9 | 16 |

TABLE 5-continued

Each set corresponds to an access sub-frame.

| | CR preamble | | | CR preamble | | | CR preamble | | | CR preamble | |
|---|---|---|---|---|---|---|---|---|---|---|---|
| UE6 | 11 | 12 | UE14 | 11 | 14 | UE22 | 11 | 16 | UE30 | 11 | 2 |
| UE7 | 13 | 14 | UE15 | 13 | 16 | UE23 | 13 | 2 | UE31 | 13 | 4 |
| UE8 | 15 | 16 | UE16 | 15 | 2 | UE24 | 15 | 4 | UE32 | 15 | 6 |

| Set5 | 1rst | 2nd | Set6 | 1rst | $2^{nd}$ | Set7 | 1rst | 2nd | Set8 | 1rst | 2nd |
|---|---|---|---|---|---|---|---|---|---|---|---|
| UE33 | 1 | 10 | UE41 | 1 | 12 | UE49 | 1 | 14 | UE57 | 1 | 16 |
| UE34 | 3 | 12 | UE42 | 3 | 14 | UE50 | 3 | 16 | UE58 | 3 | 2 |
| UE35 | 5 | 14 | UE43 | 5 | 16 | UE51 | 5 | 2 | UE59 | 5 | 4 |
| UE36 | 7 | 16 | UE44 | 7 | 2 | UE52 | 7 | 4 | UE60 | 7 | 6 |
| UE37 | 9 | 2 | UE45 | 9 | 4 | UE53 | 9 | 6 | UE61 | 9 | 8 |
| UE38 | 11 | 4 | UE46 | 11 | 6 | UE54 | 11 | 8 | UE62 | 11 | 10 |
| UE39 | 13 | 6 | UE47 | 13 | 8 | UE55 | 13 | 10 | UE63 | 13 | 12 |
| UE40 | 15 | 8 | UE48 | 15 | 10 | UE56 | 15 | 12 | UE64 | 15 | 14 |

The invention claimed is:

1. A network comprising:
at least one base station and a plurality of associated terminals for the exchange of payload data and control data over at least one common transmission channel which is provided for the access of several terminals,
wherein the base station controls the access to the common transmission channel,
wherein each of the terminals is configured to send at least an access request signal to the base station for the purpose of obtaining access to the common transmission channel,
wherein the base station is configured to assign each of the terminals at least one subset of available preambles or a full set of available preambles,
wherein the base station is configured to assign each terminal at least one start moment for access to the common transmission channel, and
wherein the base station is configured to assign a subset of start moments to a terminal that is assigned a subset of preambles, and wherein the base station is configured to assign all start moments to a terminal that is assigned the full set of available preambles.

2. The network as claimed in claim 1, wherein the subset of preambles comprises one or more preambles.

3. The network as claimed in claim 1, wherein the subset of start moments comprises one or more start moments.

4. The network as claimed in claim 1, wherein the base station is configured to send a collision detection signal to the terminals in the case of colliding access request signals, which collision detection signal indicates to the terminals that a subsequent sending of the collision resolution signal is necessary.

5. The network as claimed in claim 1, wherein the base station is configured to send a positive acknowledge signal to a terminal when the access request signal of this terminal was received at a sufficient power level and when the respective access request signal was sent by only one terminal within an access time frame.

6. The network as claimed in claim 1, wherein each access request signal is exclusively assigned to one common transmission channel.

7. The network as claimed in claim 1, wherein a start moment is exclusively assigned to each terminal for sending its access request signal.

8. The network as claimed in claim 1, wherein an assignment of at least one of collision resolution preambles and start moments to the individual terminals is based on the number of terminals authorized to access a common transmission channel.

9. The network as claim in claim 1, wherein the subsets of collision resolution preambles assigned to respective terminals by the base station are each chosen such that they differ from the subsets of all other terminals.

10. A base station comprising:
a control circuit configured to control access to a common transmission channel that is accessed by the plurality of terminals; and
at least one antenna configured to communicate with one or more terminals for the exchange of payload data and control data;
wherein the control circuit is configured to receive an access request from the one or more terminals and to control access to the common transmission channel,
wherein the control circuit is configured to assign each of the terminals at least one subset of available preambles or a full set of available preambles,
wherein the control circuit is configured to assign each terminal at least one start moment for access to the common transmission channel, and
wherein the control circuit is configured to assign a subset of start moments to a terminal that is assigned a subset of preambles, and wherein the control circuit is configured to assign all start moments to a terminal that is assigned the full set of available preambles.

11. The base station as claimed in claim 10, wherein the subset of preambles comprises one or more preambles.

12. The base station as claimed in claim 10, wherein the subset of start moments comprises one or more start moments.

13. The base station as claimed in claim 10, wherein the control circuit is configured to send, via the at least one antenna, a collision detection signal to the terminals in the case of colliding access request signals, which collision detection signal indicates to the terminals that a subsequent sending of the collision resolution signal is necessary.

14. The base station as claimed in claim 10, wherein the control circuit is configured to send, via the at least one antenna, a positive acknowledge signal to a terminal when the access request signal of this terminal was received at a sufficient power level and when the respective access request signal was sent by only one terminal within an access time frame.

15. The base station as claimed in claim 10, wherein each access request signal is exclusively assigned to one common transmission channel.

16. The base station as claimed in claim 10, wherein a start moment is exclusively assigned to each terminal for sending its access request signal.

17. The base station as claimed in claim 10, wherein the control circuit is configured to assign at least one of collision resolution preambles and start moments to the individual terminals based on the number of terminals authorized to access a common transmission channel.

18. The base station as claimed in claim 10, wherein the control circuit is configured to select the subsets of collision resolution preambles assigned to respective terminals such that they differ from the subsets of all other terminals.

19. A telecommunication terminal comprising:
a control circuit configured to control access requests to a common transmission channel that is controlled by a base station; and
at least one antenna configured to communicate with the base station for the exchange of payload data and control data;
wherein the control circuit is configured to receive, via the at least one antenna, an assignment of at least one subset of available preambles or a full set of available preambles and at least one subset of available start moments or all available start moments for use with the access request,
and wherein the control circuit is configured to transmit, via the at least one antenna, an access request to the base station with a preamble selected from the assigned preambles for accessing the common transmission channel,
wherein the control circuit is configured to transmit, via the at least one antenna, the access request at a start moment selected from the assigned start moments, and
wherein a subset of start moments are assigned to the terminal if it is assigned a subset of preambles, and wherein all available start moments are assigned to the terminal if it is assigned the full set of available preambles.

20. The telecommunication terminal of claim 19, wherein the subset of preambles comprises one or more preambles.

21. The telecommunication terminal of claim 19, wherein the subset of start moments comprises one or more start moments.

* * * * *